US 9,183,092 B1
Nov. 10, 2015

(12) United States Patent
Marr et al.

(54) AVOIDANCE OF DEPENDENCY ISSUES IN NETWORK-BASED SERVICE STARTUP WORKFLOWS

(71) Applicant: Amazon Technologies, Inc., Reno, NV (US)

(72) Inventors: Michael David Marr, Monroe, WA (US); Matthew D. Klein, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 188 days.

(21) Appl. No.: 13/746,228

(22) Filed: Jan. 21, 2013

(51) Int. Cl.
*G06F 11/14* (2006.01)
*G06F 9/44* (2006.01)

(52) U.S. Cl.
CPC .......... *G06F 11/1417* (2013.01); *G06F 9/4401* (2013.01)

(58) Field of Classification Search
CPC .................................................. G06F 11/1417
USPC ......................................... 714/4.1, 36, 47.1
See application file for complete search history.

(56) References Cited

U.S. PATENT DOCUMENTS

| | | | | |
|---|---|---|---|---|
| 7,216,158 B2 * | 5/2007 | Revanuru et al. | ............. | 709/223 |
| 7,228,405 B2 * | 6/2007 | Rothman et al. | ............. | 713/1 |
| 7,490,317 B1 * | 2/2009 | Hahn et al. | ............. | 717/121 |
| 7,836,055 B2 * | 11/2010 | MacMahon et al. | ............. | 707/740 |
| 8,074,231 B2 * | 12/2011 | Hunt et al. | ............. | 719/321 |
| 8,108,878 B1 * | 1/2012 | Pulsipher | ............. | 718/106 |
| 8,788,663 B1 * | 7/2014 | Adogla et al. | ............. | 709/225 |
| 8,959,402 B2 * | 2/2015 | Giddi | ............. | 714/47.3 |
| 2005/0283786 A1 * | 12/2005 | Dettinger et al. | ............. | 718/104 |
| 2007/0101432 A1 * | 5/2007 | Carpenter | ............. | 726/25 |
| 2007/0178968 A1 * | 8/2007 | Cote-Charpentier et al. | .. | 463/42 |
| 2008/0052729 A1 | 2/2008 | Paul et al. | | |
| 2009/0300604 A1 * | 12/2009 | Barringer | ............. | 717/178 |
| 2010/0259536 A1 * | 10/2010 | Toksvig et al. | ............. | 345/418 |
| 2011/0131447 A1 * | 6/2011 | Prakash et al. | ............. | 714/19 |
| 2011/0185339 A1 * | 7/2011 | Andrade et al. | ............. | 717/104 |
| 2011/0219368 A1 * | 9/2011 | Festi | ............. | 717/174 |

(Continued)

OTHER PUBLICATIONS

Marshall, David. Top 10 benefits of server virtualization. InfoWorld. Nov. 2, 2011 [retrieved on Aug. 18, 2014]. Retrieved from the Internet <URL: http://www.infoworld.com/d/virtualization/top-10-benefits-server-virtualization-177828>, 3 pages.

(Continued)

*Primary Examiner* — Gabriel Chu
*Assistant Examiner* — Paul Contino
(74) *Attorney, Agent, or Firm* — Lee & Hayes, PLLC

(57) ABSTRACT

A system and method for preventing dependency problems, such as deadlocks, within startup of computing service workflows, such as workflows that occur within computing assets that provide network-based computing services. The system and method creates a remedial workflow or action for the computing services to address deadlocks or other blocking conditions within the services which may occur should the underlying computing assets need to be restarted, rebooted or sequentially execute and reach a problematic operational state. The system and method will determine the reliance of each computing service upon the functionality of one or more other network-based computing services and structure the remedial workflow accordingly. Other aspects of the disclosure are described in the detailed description, figures, and claims.

24 Claims, 5 Drawing Sheets

(56) References Cited

U.S. PATENT DOCUMENTS

| | | | |
|---|---|---|---|
| 2011/0276682 A1* | 11/2011 | Ding et al. | 709/224 |
| 2011/0289345 A1* | 11/2011 | Agesen et al. | 714/4.11 |
| 2012/0102486 A1 | 4/2012 | Yendluri | |
| 2012/0290706 A1* | 11/2012 | Lin et al. | 709/224 |
| 2013/0097183 A1* | 4/2013 | McCracken | 707/748 |
| 2013/0124712 A1* | 5/2013 | Parker | 709/224 |
| 2013/0159999 A1* | 6/2013 | Chiueh et al. | 718/1 |
| 2013/0227356 A1* | 8/2013 | Kim et al. | 714/48 |
| 2014/0089346 A1* | 3/2014 | Li | 707/781 |
| 2014/0165054 A1* | 6/2014 | Wang et al. | 718/1 |

OTHER PUBLICATIONS

Office action for U.S. Appl. 13/746,215, mailed on Nov. 10, 2014, Michael David Marr, "Addressing Dependency Issues in Computing Environments", 31 pages.

Final Office Action for U.S. Appl. 13/746,215, mailed on Mar. 24, 2015, Michael David Marr, "Addressing Dependency Issues in Computing Environments", 29 pages.

Office Action for U.S. Appl. No. 13/746,215, mailed on Jul. 14, 2015, Michael David Marr, "Correction of Dependency Issues in Network-Based Service Remedial Workflows", 18 pages.

\* cited by examiner

AVOIDANCE OF DEPENDENCY ISSUES IN NETWORK-BASED SERVICE STARTUP WORKFLOWS

BACKGROUND

Consolidation of computing resources in data centers is becoming common. Data centers provide a centrally operated, large-scale, network-accessible pool of computing platforms which can be shared by a large number of customers. Online computing services, such as web or cloud services, can likewise be operated on these physical computing assets to provide useful computing services for customer software.

If the physical resources that support the online computing services fail or become inoperative, such as through a natural disaster or other large scale event, the computer resources may fail to automatically restart, reboot, sequentially execute or otherwise return to an operable state once the event is resolved. Failure to properly restart may be the result of a set of unsatisfied boot up requirements for the physical servers or software services operating on the physical servers. These conditions may require human operator or other manual intervention to resolve "deadlock conditions" such as where a first service inadvertently requires a second service to boot first and where the second service likewise requires the first service to boot first.

The computing services can be within the same data center or in separate physical locations, but given the precondition of operation of the computing functionality, inadvertent human intervention or other unforeseen errors in startup, the startup sequence of the physical resources may result in deadlock conditions of the actual programs running or state of operations in the network-based services. The efficient maintenance of workflows within the network-based services can thus be problematic in the distributed network-based services environment.

DETAILED DESCRIPTION

Figure 1:
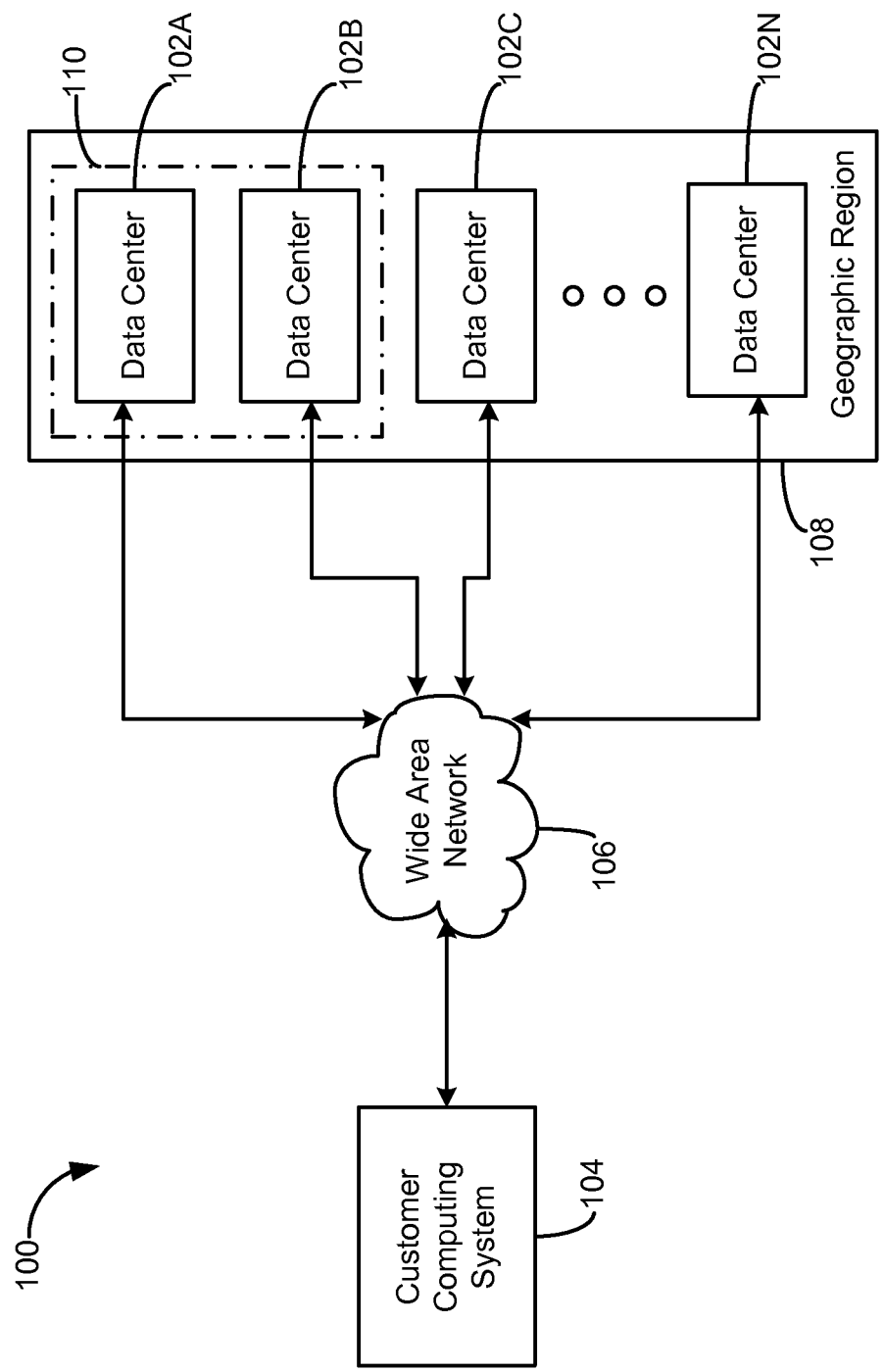
FIG. 1 illustrates an example of a system and network diagram showing aspects of one illustrative operating environment for the embodiments disclosed herein for network-based computing services.

This disclosure describes a system and method for preventing dependency problems within a computing environment, such as a group of one or more data centers. In an embodiment, a dependency management service can access dependency information and use it to build dependency graphs between resources. For example, the dependency management service can generate a dependency graph for one or more computing assets in the computing environment, where a node can represent a computing asset or a service and the edges can represent dependencies. The dependency management service can use the graphs to generate startup start up strategies for data environments. In addition, in example embodiments the dependency management service can generate remedial workflows to handle circular dependency problems, e.g., situations where computing assets either directly or indirectly depend on each other to function properly and the computing assets are waiting for each other by changing dependencies, restarting or rebooting servers, or otherwise resolving deadlock or other blocking conditions. Examples of dependency problems are a deadlock, a hanging state, data collision, and/or read/write fault, or other problems that can result from circular dependency between computing assets.

In an example embodiment, the dependency management service can be used in an environment where the computing assets provide networked services, such as a program execution service ("PES"), database processing and storage services, or other computing services that are accessible to one or more client devices across a network. In this embodiment, the dependency management service can be used to detect and determine the reliance of each computing asset upon the functionality of one or more other computing assets among the computing assets, then create, at least, a startup strategy for the computing assets that should prevent computing assets from starting until the necessary dependent services are operational. In the same, or another embodiment, the system can create a remedial workflow to remedy the operation of a computing asset when functionality of other necessary computing assets is unavailable or the computing assets are waiting for the computing asset to execute. The execution of the remedial workflow within the computing assets can prevent and/or temporarily bypass the dependency problem within the computing assets.

The remedial workflow for the computing assets can be a bootstrap reboot, or full or partial restart of the computing assets or services, or the implementation of programmatic logic within the computer resources, and can occur immediately or at a predetermined time or precondition. In one embodiment, each computing asset can include a software program, e.g., an agent, that can communicate dependency information to the dependency management service and the service. For example, each computing asset can include a web server the exposes an application programming interface (API) for communication of dependency information for the computing asset to the dependency management service. An agent can send web-service requests to the API of the dependency management service to update the service with dependency information. Similarly, the dependency management service can send web-service request to the API of a computing asset to request dependency information and resolve dependency problems. In addition, in some embodiments, the dependency management service can be configured to receive input from a user relating to dependencies of computing assets via a graphical user interface.

In one embodiment, the dependency management service can create a startup sequence based upon analysis of the graphs to detect cycles representing logical or physical circular dependencies. In response to detecting such dependencies, the dependency management service can generate a startup and/or remediation workflow to ensure that the computing assets physically located within a specific physical or logical failure domain within the one or more data centers based upon the determination of the reliance of each computing asset upon the functionality of one or more other computer assets, which would avoid the deadlock from occurring. If the computer assets are further spread across a plurality of geographic area, the system and method can further determine reliance of each computing asset upon the functionality of one or more other computing assets based upon the geographic area of the computer assets.

Furthermore, determining the reliance of each computer asset upon the functionality of one or more other computer assets can include simulating a workflow of the network. Monitoring the performance of the network-based computer assets can also occur to resolve any dependency that occurs there within.

In accordance with various embodiments, the computing environment is a network-accessible computing platform. For instance, one or more entities may host and operate a network-accessible computing platform that includes different types of network services, such as a storage service, a load balancing service, a computing service, a database service, or any other similar or different type of network-accessible service. The services are implemented using various computing devices, wherein the computing devices include one or more processors that each includes one or more processing cores.

FIG. 1 and the following description are intended to provide a brief, general description of a suitable computing environment in which the embodiments described herein may be implemented. In particular, FIG. 1 is a system and network diagram that shows an illustrative operating environment 100 that includes a platform 108 for providing on-demand access to computing resources for a specific availability zone. As will be described in greater detail below, the computing resources may be launched or otherwise instantiated based upon an expected cost and value of the computing resources to an operator of the platform. An "availability zone" 110 represents a group of one or more data centers within an area that are engineered to be isolated from failures in other availability zones. In addition, an availability zone may have low latency network connectivity to other availability zones in the same geographic region 108. It is preferable to have customers use multiple availability zones 110 because the potential of failure of one data center, e.g. data center 102A, does not tremendously adversely impact the customer's operations. The geographic region 108 can also serve as a logical domain for the data centers 102A-N to determine potential dependency issues as is further described herein.

The platform can provide computing services for executing applications on a permanent or an as-needed basis. The computing services provided by the platform may include various types of services, such as data processing resources, data storage resources, data communication resources, and the like. Each type of computing service may be general-purpose or may be available in a number of specific configurations. For example, data processing resources may be available. The instances may be configured to execute applications, including Web servers, application servers, media servers, database servers, and the like. Data storage resources may include file storage devices, block storage devices, and the like.

Each type or configuration of computing service may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing services provided by the platform are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations or availability zones 110. One illustrative configuration for a data center 102 that implements the concepts and technologies disclosed herein for providing computing services will be described below with regard to FIG. 2.

The customers and other consumers of the platform may access the computing services provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote customers and other users may be utilized. It should also be appreciated that combinations of such networks might also be utilized.

The customer computing system 104 is a computer utilized by a customer or other consumer of the platform. For instance, the customer computing system 104 may be a server computer, a desktop or laptop personal computer, a tablet computer, a wireless telephone, a PDA, an e-reader, a game console, a set-top box, or any other computing device capable of accessing the platform.

As will be described in greater detail below, the customer computing system 104 may be utilized to configure aspects of the computing services provided by the PES platform. In this regard, the platform might provide a Web interface through which aspects of its operation may be configured through the use of a Web browser application program executing on the customer computing system 104. Alternatively, a stand-alone application program executing on the customer computing system 104 might access an API exposed by the platform for performing the configuration operations. Other mechanisms for configuring the operation of the platform might also be utilized.

According to embodiments disclosed herein, the capacity of purchased computing services provided by the platform can be scaled in response to demand. In this regard, scaling refers to the process of instantiating (which may also be referred to herein as "launching" or "creating") or terminating (which may also be referred to herein as "de-scaling") instances of computing services in response to demand. In this manner, the capacity of services purchased by a customer of the platform can be scaled on-demand.

The platform may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, and other types of information. The deployment component utilizes the customer-provided configuration logic to configure and launch new instances of computing resources.

Figure 2:
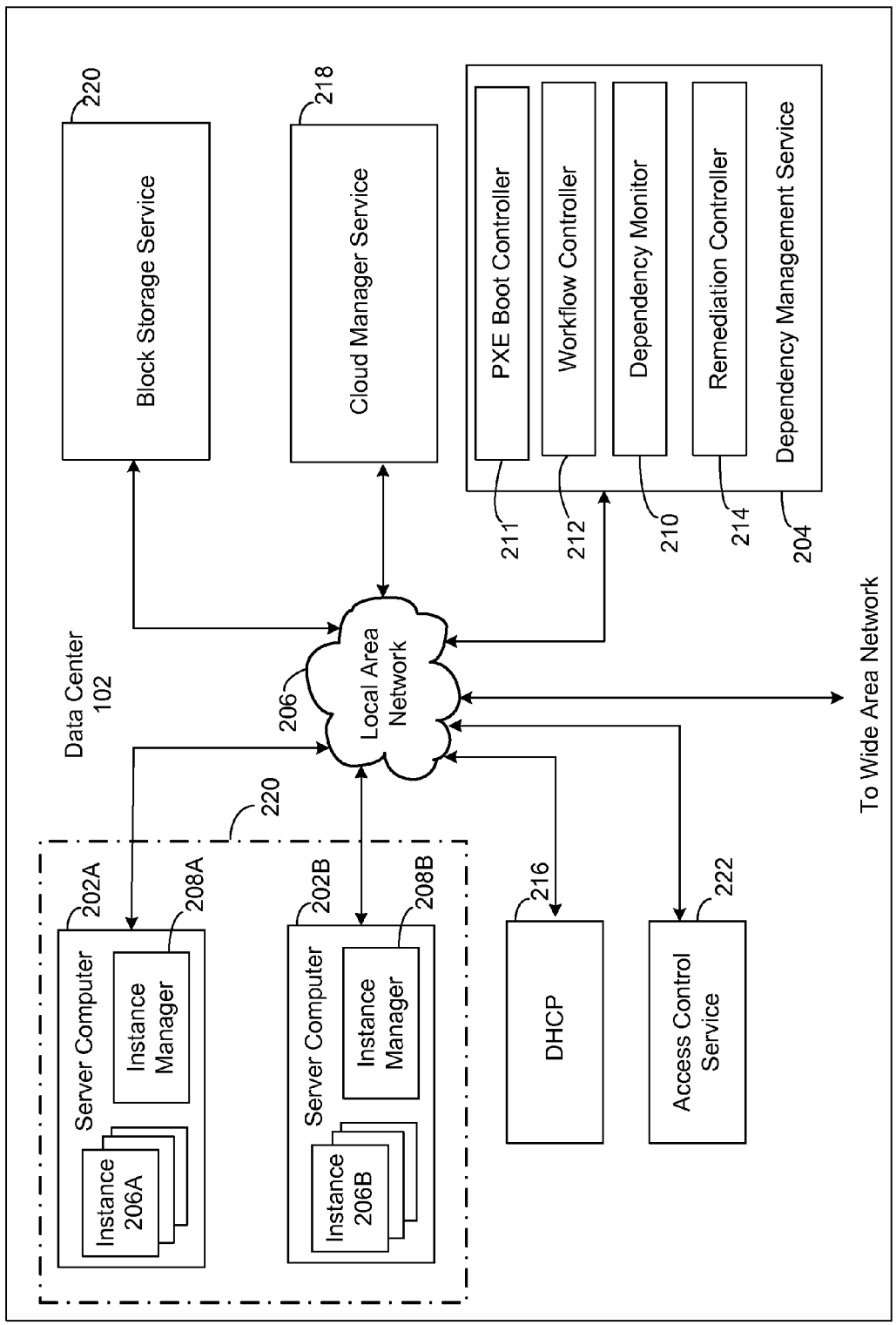
FIG. 2 illustrates a computing system diagram for a configuration for a data center that launches supports network-based computing services, and that implements the concepts and technologies disclosed herein.

FIG. 2 is a computing system diagram that illustrates one configuration for a data center 102 that implements at least a program execution service, including the concepts and technologies disclosed herein. As shown by the figure, the example data center 102 shown in FIG. 2 includes several server computer 202A and server computer 202B for hosting instances for customers.

The server computers 202A and B may be standard tower or rack-mount server computers configured appropriately for hosting instances. The server computers 202 can be located within a physical failure domain 220 within the data center 102, such as within a physical firewall, sprinkler system or alternately powered area should power be interrupted. The physical failure domain 220 can be used herein to increase the likelihood that given physical computing assets, such as servers 202, are likely to be on or restarted in a given sequence to address dependency issues, such as by avoiding deadlocks or remediating deadlocks if they occur.

In one embodiment, the instances 206A and 206B (which may be referred herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202A and 202B may be configured to execute an instance manager 208 capable of executing the instances. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of computing service instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

Continuing with the description of FIG. 2, also illustrated are services and systems that the program execution service are dependent upon. For example, one such system is a dynamic host configuration protocol ("DHCP") service 216. In an embodiment, the DHCP service 216 can configure network devices to enable them to communicate over local area network 206. For example, the DHCP service 216 can provide information such as IP addresses, default routes, and a domain name service ("DNS") address to networking devices.

Higher level services that rely on functionality provided by the DNS, such as those that support the program execution service are also illustrated in FIG. 2. For example, FIG. 2 also shows a cloud manager service 218, a block storage service 220, and an access control service 222. Other services may be used to support a program execution service and these services are called out to provide an example environment for describing embodiments of the disclosure. The cloud manager service 218 is responsible for launching and terminating instances. Similarly, the block storage service 220 may be used by the hosts 202A and B to provide block storage to instances as they operate and the access control service 222 may be used to manage credentials used by other services to gain access to resources. As such, in an embodiment the cloud manager service 218 may be dependent on the block storage service 220 as well as the access control service 222 and the DHCP service 216 in order to function. In addition, the access control service 222 and block storage service 220 may be dependent on the DHCP service 216 as well as other services (not shown). All of these services may create a tangled web of dependencies, some of which may be circular and/or cause deadlocks to occur in certain situations.

The data center 102 shown in FIG. 2 also includes a dependency management service 204, which includes a dependency monitor 210, a PXE Boot Controller 211, a workflow controller 212, and a remediation controller 214. These elements can all be present on the same physical server or can be distributed among a plurality of severs that implement a distributed service. As embodied herein, the dependency monitor 210 can monitor the computing assets, such as the servers 202A and 202B, as well as the other services operating within data center 102 and determine if dependency issues are present therewith. The determination of dependency can be accomplished through the use of a dependency graph that is generated from acquiring dependency information from computing assets, manual input, and/or graph analysis. In some instances, a dependency can be a hard dependency, e.g., a computing asset may always be dependent on some other system or service, or the dependency could be a potential dependency that may occur upon a given scenario, e.g. power outage, equipment failure, data center disaster, etc. The detection can also be of a current dependency issue within the data center 102, e.g. an existing deadlock, resource contention, a hanging operation, excessive read/write faults, etc.

In an embodiment, upon a dependency issue being detected by the dependency monitor 210, the remediation controller 214 is invoked to determine what actions must occur to resolve the dependency problem. Thus, the remediation controller 214 will note what the dependency issue is, e.g., priority service dependent upon functionality provided by a lower-priority service or resource or a graph shows circular dependencies exist between multiple services, a physical or logical domain issue, a problematic data flow, etc., and then create a remedial workflow of actions that address the problem, e.g. relocating or reassigning computing assets, changing communication protocols, restarting service daemons, etc.

Once the remedial workflow is created, the workflow controller 212 will then control the execution of the actions for the workflow to address the dependency problem. If the dependency problem is immediate, the workflow controller 212 can effect immediate actions to correct the problem and interact with other appropriate systems as necessary. For example, the workflow controller 212 can create work tickets or other service orders for technicians to act upon, can direct equipment to power down or restart to break a deadlock or resolve other dependency problems, and can otherwise interact with existing computing assets to resolve the problem.

If the dependency problem is not immediate, e.g., the problem may occur in the future upon certain conditions happening, the workflow controller 212 can set up the most optimal method of executing the workflow sequence to avoid the potential problem. For example, the workflow actions can be executed opportunistically, such as when computing assets power down or rebooting for other reasons. Or the workflow controller 212 can have the actions occur upon some other precondition being met, especially if the conditions that would cause the dependency are unlikely. For example, if multiple data centers of a certain geographic region 108 need to be offline in order for a dependency problem to arise, then the workflow controller 212 can only commence the workflow actions upon one of the data centers 102 in the geographic region 108 going offline.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between each of the data centers 102A-102N, between each of the server computers 202A-202N in each data center 102, and between instances 206 purchased by each customer of the geographic region 108. These network topologies and devices should be apparent to those skilled in the art.

It should also be appreciated that the data center 102 described in FIG. 2 is merely illustrative and that other implementations might be utilized. In particular, functionality described herein as being performed by the dependency monitor 210, the workflow controller 212, and the remediation controller 214 might be performed by one another, might be performed by other components, or might be performed by a combination of these or other components. Additionally, it should be appreciated that this functionality might be implemented in software, hardware, or a combination of software and hardware. Other implementations should be apparent to those skilled in the art.

Figure 3:
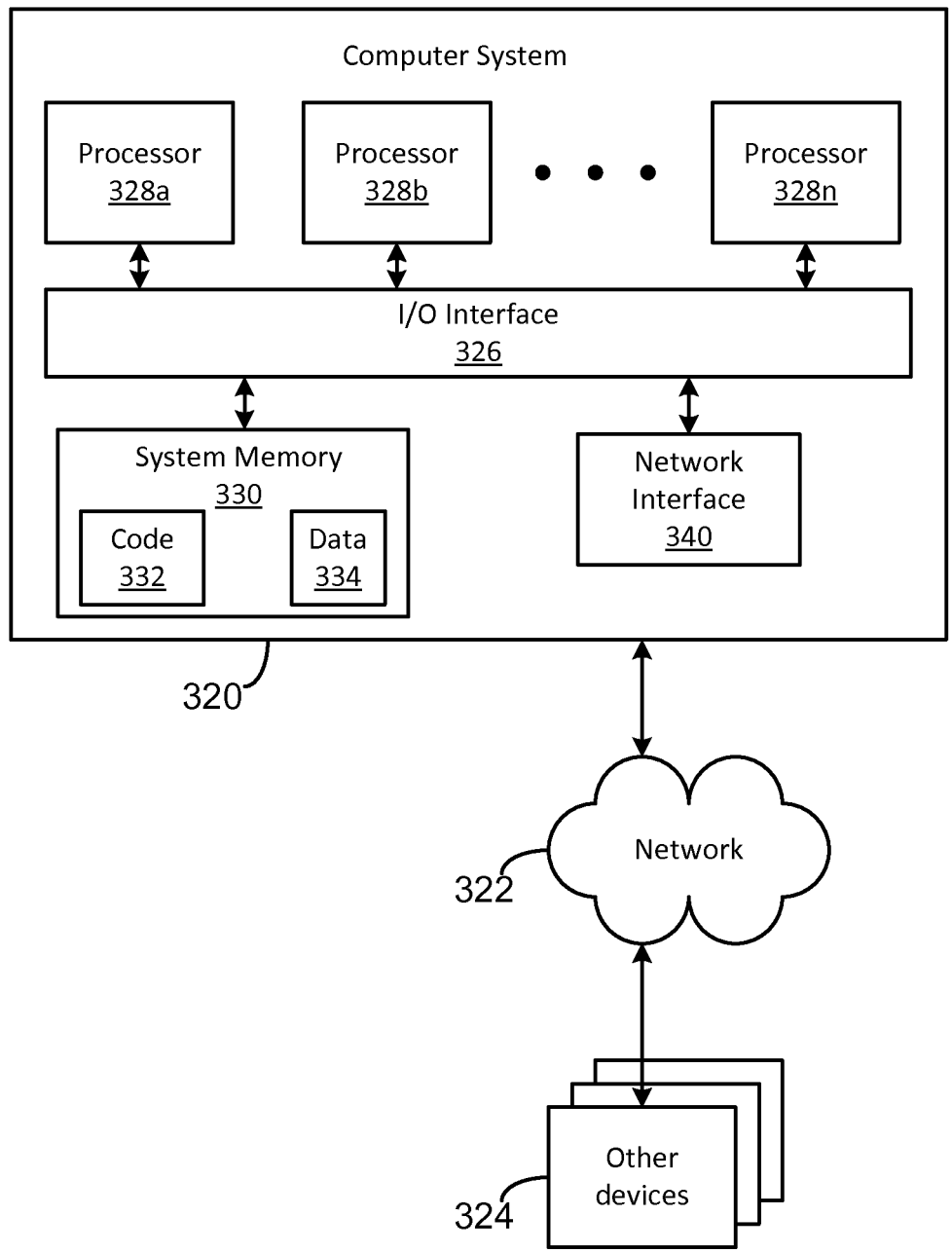
FIG. 3 is a block diagram illustrating an example of a computer platform communicating with other devices across a network.

In at least some embodiments, a server that implements a portion or all of one or more of the technologies described herein, including the techniques to remediate or bypass dependency issues within the data center 102, may include a general-purpose computer system that includes or is configured to access one or more computer-accessible media, such as computer system 320 illustrated in FIG. 3. In the illustrated embodiment, computer system 320 includes one or more processors 328 coupled to a system memory 330 via an input/output (I/O) interface 326. Computer system 320 further includes a network interface 340 coupled to I/O interface 326.

In various embodiments, computer system 320 may be a single processor system including one processor 328, or a multiprocessor system including several processors 328a-328n (e.g., two, four, eight, or another suitable number). Processors 328a-328n may be any suitable processors capable of executing instructions. For example, in various embodiments, processors 328a-328n may be general-purpose or embedded processors implementing any of a variety of instruction set architectures (ISAs), such as the x86, PowerPC, SPARC, or MIPS ISAs, or any other suitable ISA. In multiprocessor systems, each of processors 328a-328n may commonly, but not necessarily, implement the same ISA.

System memory 330 may be configured to store instructions and data accessible by processor(s) 328a-328n. In various embodiments, system memory 330 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 330 as code 332 and data 334.

In one embodiment, I/O interface 326 may be configured to coordinate I/O traffic between processors 328a-328n, system memory 330, and any peripheral devices in the device, including network interface 340 or other peripheral interfaces. In some embodiments, I/O interface 326 may perform any necessary protocol, timing or other data transformations to convert data signals from one component (e.g., system memory 330) into a format suitable for use by another component (e.g., processor 328a). In some embodiments, I/O interface 326 may include support for devices attached through various types of peripheral buses, such as a variant of the Peripheral Component Interconnect (PCI) bus standard or the Universal Serial Bus (USB) standard, for example. In some embodiments, the function of I/O interface 326 may be split into two or more separate components, such as a north bridge and a south bridge, for example. Also, in some embodiments some or all of the functionality of I/O interface 326, such as an interface to system memory 330, may be incorporated directly into one or more processors 328a-328n.

Network interface 340 may be configured to allow data to be exchanged between computer system 320 and other devices 324 attached to a network or networks 322, such as other computer systems or devices as illustrated in FIGS. 1-2, for example. In various embodiments, network interface 340 may support communication via any suitable wired or wireless general data networks, such as types of Ethernet network, for example. Additionally, network interface 340 may support communication via telecommunications/telephony networks such as analog voice networks or digital fiber communications networks, via storage area networks such as Fibre Channel SANs, or via any other suitable type of network and/or protocol.

In some embodiments, system memory 330 may be one embodiment of a computer-accessible medium configured to store program instructions and data for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 320 via I/O interface 326. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 320 as system memory 330 or another type of memory. Further, a computer-accessible medium may include transmission media or signals such as electrical, electromagnetic, or digital signals, conveyed via a communication medium such as a network and/or a wireless link, which may be implemented via network interface 340. Portions or all of multiple computer systems such as that illustrated in FIG. 3 may be used to implement the described functionality in various embodiments; for example, software components running on a variety of different devices and servers may collaborate to provide the functionality.

FIGS. 4-7 are processes that the architecture of FIGS. 1, 2 and 3 may implement. These processes (as well as other processes described throughout) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to network-accessible computing platforms, the architectures and techniques are equally applicable to other computing environments and computing devices.

Figure 4:
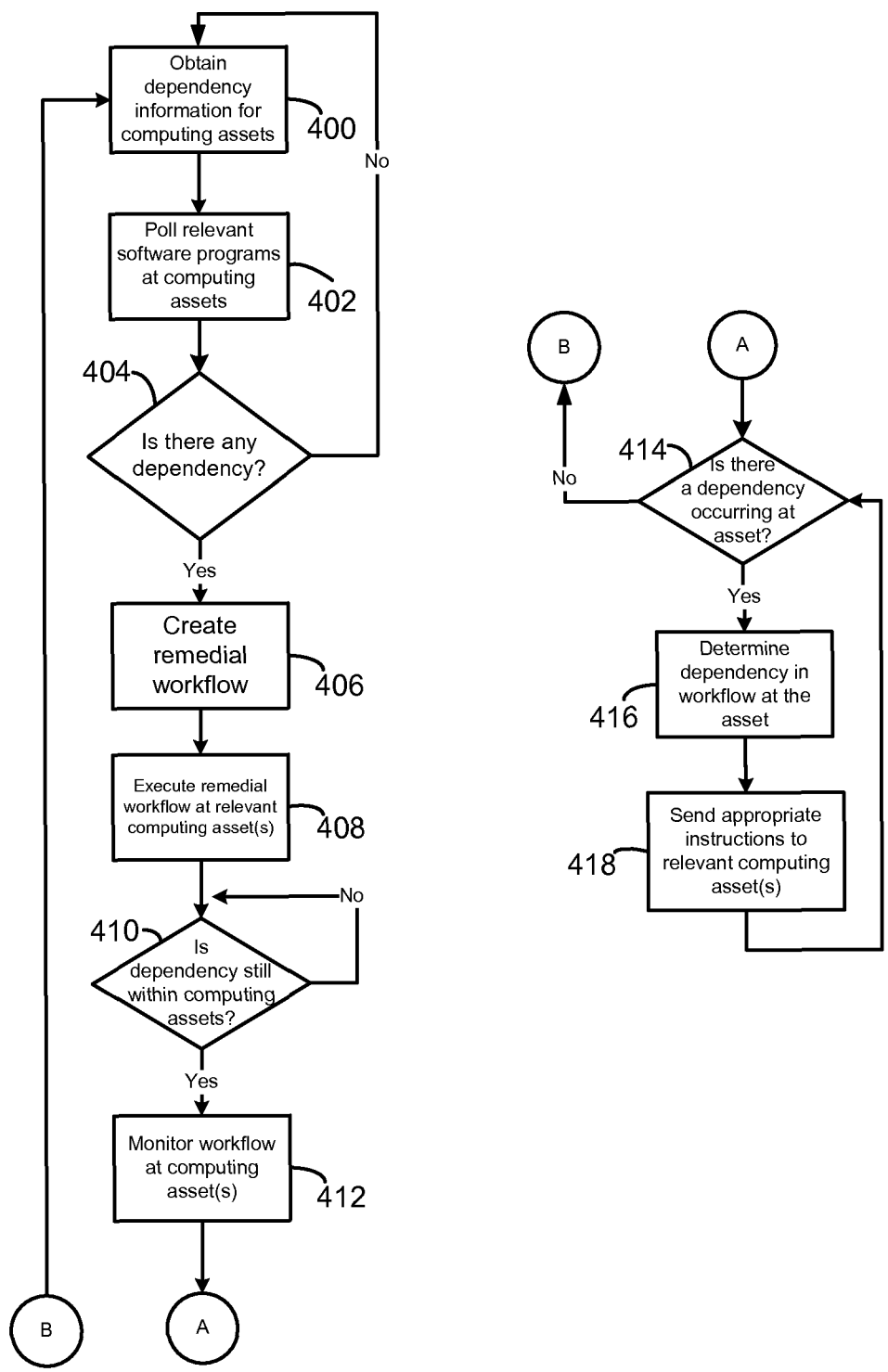
FIG. 4 is a flowchart illustrating one embodiment of a process for determining the potential dependency of computing assets within an availability zone and creating a remedial workflow to address the potential dependencies.

FIG. 4 is a flowchart illustrating one embodiment of a process determining the potential dependency of computing assets, such as computing assets with a geographic region that provides specific computing services, and creating a remedial workflow to address the potential dependencies that could cause problems. The process could be performed by the dependency management service 204 of FIG. 2. Information on the dependency information for the computing assets, such as servers 202 in FIG. 2, are obtained, as shown by operation 400, and then the relevant software programs of those computing assets are polled for their dependency information, as shown at operation 402. The system can likewise be embodied such that the computing assets push data regarding their dependency to the appropriate system, such as dependency management service 204 in FIG. 2. In this embodiment, the computing device gathers the relevant information through polling an API at the relevant software and then creates the remedial workflow as described herein.

In an embodiment, the dependency management service can maintain and manage a dependency graph, or like data structure, that stores the status of the current computing assets and continuously manages the dependency status of all the monitored computing assets. In such manner, the system can quickly and efficiently update the dependency graph should new computing assets appear in the computing environment that could cause dependency with existing computing assets.

The relevant data could be gathered by static analysis of the computer assets to predict a dependency in process execution, or alternately, can be a dynamic analysis of system performance, such as by analyzing network traffic to identify relationships between different systems or services. Examples of such dynamic analysis can be determining which services communicate with each other with frequency, or the data flow directionality within specific workflows. Thus, any method known in the art to determine software or hardware dependency can be used in the present system to either directly detect or infer dependency.

There are also other methods to gather the information, such as the computing assets themselves automatically sending the information as is further described herein. For example, each computing asset can include an agent that determines systems or services obtains functionality from and sends a list of systems or services and the functions they use the systems or services for to the dependency management service. Furthermore, a user can also determine dependencies within the computing assets and manually input known dependencies to supplement the data provided by the automated process of operation 402 into the dependency management service. After the relevant data has been gathered at operation 402, a determination is then made as to whether there is any dependency problem, e.g., circular dependency, deadlock, etc., within the computing assets, as shown at decision 404. Decision 404 can thus be sending signals out to the computing assets to see if the active state indicates there is dependency problem present. The dependency problem can be an active problem, e.g. a deadlock, hanging state, data fault is currently occurring, or it can be conditional, e.g. that a dependency problem may arise under certain conditions. If there is no dependency problem at decision 404, the process iterates to operation 400 to again gather relevant data. Otherwise, if there is dependency problem at decision 404, then a remedial workflow is created that will address the dependency issue in the computing assets, as shown at operation 406, and the remedial workflow is executed on the relevant computing asset(s), as shown at operation 408. As can be appreciated, the remedial workflow may be created at any time prior to execution, including as a response to monitored failure conditions such as a server failing to enter a correct operational state.

The workflow action can be executed, such as by the workflow controller 212 in FIG. 2, either immediately or at an opportunistic time within the computing assets. In this embodiment, the computing device executing the process of FIG. 4 does not control the actual operation of the computing assets, but it should be apparent that the same device could actually control the computing assets if so embodied. The remedial workflow can be a partial or full reboot of the computing assets, power down of assets, a program patch or execution sequence optimization, instructions to move physical computer assets into or out of a physical failure domain 220 or logical domain, or other action that will address the dependency problems.

After the remedial workflow has been executed at computing assets at operation 408, a determination is then made as to whether a dependency problem still occurs in the computing assets, as shown at decision 410. If no dependency problem exists at decision 410, then the process iterates thereat to the monitor for computing asset dependency problems. If a dependency problem has occurred at decision 410 then the workflow computing asset(s) is specifically monitored as shown at operation 412. This monitoring of the potential dependency of the computing assets is optional and the process of FIG. 4 could end after the remedial workflow has been sent out of operation 408. The process at decision 410 can thus determine if the specific state or failure has changed, or a new dependency has occurred based on the execution of the remedial workflow. For example, if a server 202 is powered off and then powered on, the server 202 may have caused another dependency problem within the computing assets while it was offline.

During the monitoring of the workflow within computing assets at operation 412, a determination is made as to whether there is a dependency issue occurring at specific computing assets, as shown at decision 414. Thus, the process can iterate from computer platform to computer platform, e.g. between servers 202, to look for dependency. If there is no dependency occurrence at decision 414, the process iterates to operation 400 to again gather the relevant data to address dependency in workflows. Otherwise, if there is a dependency problem occurring within the computing asset at decision 414, the specific dependency problem for that asset determined as shown at operation 416, e.g., what program may be in deadlock, are hung, etc., and then the appropriate instructions are sent to the relevant computing assets to resolve dependency as shown at operation 418, e.g. restart server 202A and only upon server 202A being operative, start server 202B. After the instructions are sent at operation 418, the process again iterates to decision 414 to determine if the dependency problem has been resolved.

It should be noted that the corrective monitoring of the computing assets workflow can be done by itself, without any prior remedial workflow having been provided. Thus, the process from decision 414 through operation 418 can be used to generate a later remedial workflow after a problem has initially been detected.

Figure 5:
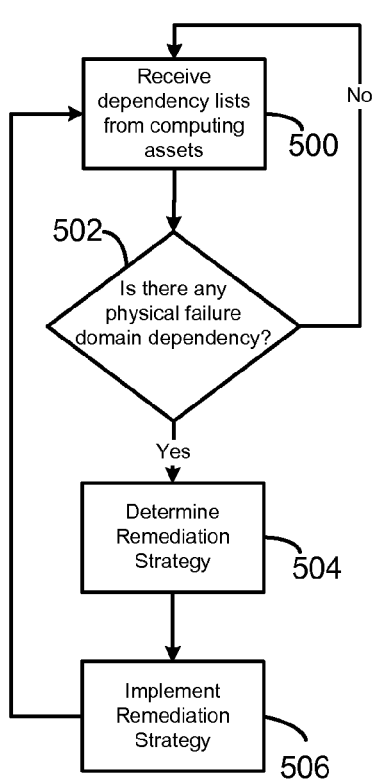
FIG. 5 is a flowchart illustrating one embodiment of a process to determine if there is any dependency related to the physical failure domain(s) of the computing assets that could be addressed by physical location of the computing assets.

FIG. 5 is a flowchart illustrating one embodiment of a process to determine if there are any dependency problems related to the physical failure domain 220 (FIG. 2) of the computing assets that could be addressed by physical relocation of the computing assets. This same process could likewise be used for a logical domain rearrangement of computing assets. In this embodiment, the process begins with the dependency lists from the computing assets being received, as shown at operation 500. Here, the agent at the computing assets will push their dependency data out to another computing device, such as a dependency management service in the data center, and the programs do not need to be polled.

After receipt of the dependency lists at operation 500, a determination is then made as to whether there are any physical failure domains or logical dependencies present, as shown at decision 502. If there is no dependency problems present at decision 502, then the process iterates to operation 500 and receives data from the programs. Otherwise, if there is physical failure domain or logical dependency problems at decision 502, then a remediation strategy can be determined. For example, this can include determining a more optimal physical placement of the computing assets or determining to change dependencies for a service. Through the physical placement of the computing assets, the restarting thereof can be controlled such as through the power allocation to the physical failure domain 220. Likewise, the computing assets can be physically located among several data centers so as to be tolerant to a catastrophe to a single data center 102 within an availability zone.

After the physical placement of the computing assets has been determined at operation 504, then the remediation strategy can be implemented, as shown at operation 506 and the process again iterates to receive the dependency lists at operation 500. For example, this can include cutting trouble tickets to agents to physically move computing assets from one physical domain to another. Similarly, in the instance that the computing assets run within virtual machines, the dependency detection management service can cause the virtual machine to be migrated from one physical domain to another. In the instance that a software dependency problem is detected that could cause a deadlock, the strategy could be a recommendation to change the software of one computing asset or service so that it has a different dependency chain. It should be noted that the process of FIG. 5 can occur by itself, or in conjunction with the other processes for determining the dependency problems described herein and those shown in FIGS. 4, 6 and 7.

Figure 6:
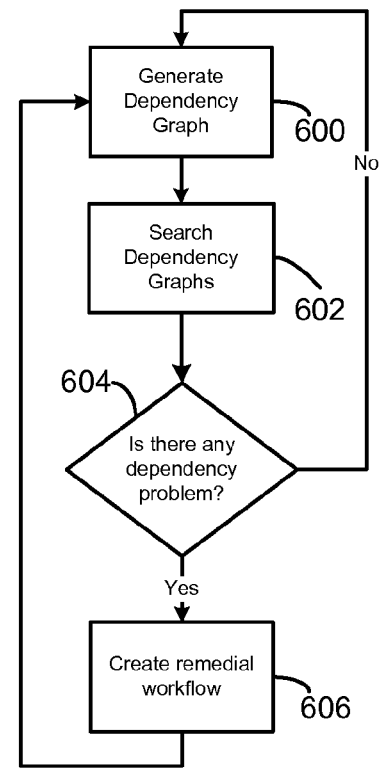
FIG. 6 is a flowchart illustrating one embodiment of a process of simulating the computing asset workflow to determine if dependency issues are present.

FIG. 6 is a flowchart illustrating one embodiment of a process of searching dependency graphs to determine if a problematic dependency is present should the requisite conditions occur within the computing assets. The process could be performed by the dependency management service of FIG. 2 within the data center, or a separate device can perform this function across the WAN 106 or Internet. Dependency information, such as dependency lists can be received from computing assets and then one or more dependency graphs can be generated, as shown by operation 600. The dependency management service can then search the dependency graphs for cycles. Again, in this embodiment, the computing device gathers the relevant information through polling an API at the relevant software and then creates the remedial workflow as described herein. However, there are other methods to gather the information, such as the computing assets themselves automatically sending the information as is further described herein. Alternately, the dependency graph or other stored or manually input information can be gathered at operation 602 to run the simulation.

After the dependency graphs have been searched, a determination is then made as to whether there are any dependency problems within the computing assets, as shown at decision 604. If there are no dependency problems at decision 604, the process iterates to operation 600 to again gather relevant data. Otherwise, if there is a dependency problems at decision 604, then a remedial workflow is created that will address the dependency problem, as shown at operation 606. After operation 606, the process can iterate to again acquire dependency data from computing assets and simulate a workflow sequence. The remedial workflow created at operation 606 would then be opportunistically effected by the workflow controller 212 as it is not intended to address a present dependency problem.

Figure 7:
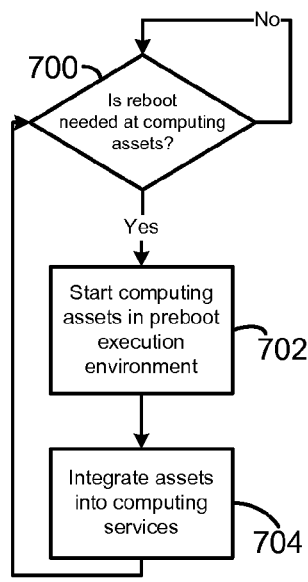
FIG. 7 is a flowchart illustrating one embodiment of a process of starting/restarting the computing assets in a preboot execution environment and then integrating those assets into computing services.

FIG. 7 is a flowchart illustrating one embodiment of a process of starting the computing assets in a preboot execution environment and then integrating those assets into computing services. The process can, in one embodiment, be controlled by the PXE Boot Controller 211 in FIG. 2. The use of a preboot execution environment (PXE, often pronounced "PiXiE" boot) is known in the art to examine and resolve potential issues in restarting computer systems. The process of a PXE boot can be used in conjunction with the other processes described in FIGS. 4, 5 and 6 to resolve dependency should those processes prove unsatisfactory in doing so. A determination is then made as to whether a restart or reboot is needed at the computing assets as is shown at decision 700. In one embodiment, the system could have flagged the earlier remedial workflow as insufficient in resolving the dependency among the computer assets. If reboot of the computing assets is not needed at decision 700, the process then iterates thereat to await needed computing assets to restart.

If reboot of the computer assets is needed at decision 700, the computing assets are started in a preboot execution environment, as is shown at operation 702. The computing assets that were PXE booted are then integrated into the online computing services, as shown at operation 704. The process then returns to decision 700 to again determine whether a reboot or restart is needed at the computing assets.

It should be noted that the use of the preboot execution environment of the restarting computing assets can be done by itself, without any prior startup routing having been provided. Thus, the process from operation 702 through operation 704 can be used to assist in resolving a problem has initially been detected in simulation.

It should be noted that several functionalities are included in the processes of FIGS. 4-7 that are merely shown for illustration, and can all be used together in the same system, or separately with independent operations of the processes used by themselves. Other functionalities can likewise be added to the processes to enhance the ability to locate and prevent dependency issues in restarting network services as would be apparent to one of skill in the art.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
    a plurality of computing assets physically located within a data center that are accessible to one or more client devices across a network; and
    a dependency management service including a processor that executes a series of computer readable instructions to cause the dependency management service to perform:
        receiving, from an individual computing asset of the plurality of computing assets, a list of software dependencies for one or more software applications resident at the respective individual computing asset;

determining, based at least in part on the list received from the individual computing asset, a reliance of at least one computing asset of the plurality of computing assets upon a functionality of one or more other computing assets within the data center; and in response to detecting a dependency problem in the plurality of computing assets from determining the reliance of the at least one computing asset upon the functionality of one or more other assets, creating a startup workflow for the plurality of computing assets of the data center, wherein the startup workflow resolves dependencies within the plurality of computing assets such that a restarting computing asset is not operating without needed functionality of other necessary one or more computing assets.

2. The system of claim 1, wherein determining the reliance of the at least one computing asset upon the functionality of one or more other computing assets is further based on managing a dependency graph of the plurality of computing assets.

3. The system of claim 1, wherein the dependency management service further performs:
   determining one or more logical failure domains within the data center; and
   selectively directing the plurality of computing assets to be logically located within a specific logical failure domain based upon the determination of the reliance of the at least one computing asset upon the functionality of one or more other computing assets.

4. A system, comprising:
   a plurality of computing assets operating in a computing environment; and
   a computer system including a processor that executes a series of computer readable instructions to cause the computer system to perform:
      receiving, from an individual computing asset of the plurality of computing assets, a list of software dependencies for one or more software applications resident at the respective individual computing asset;
      determining, based at least in part on the list received from the individual computing asset, a reliance of at least one computing asset of the plurality of computing assets upon a functionality of one or more other computing assets during startup;
      creating a startup workflow for the plurality of computing assets to resolve detected dependency problems; and
      executing the startup workflow within the plurality of computing assets.

5. The system of claim 4, wherein the computer system is further configured to perform presenting an interface to receive user input, wherein the user input indicates dependency within the plurality of computing assets.

6. The system of claim 4, wherein the at least one computing asset includes an interface for communication to the computer system, wherein the communication includes the list of software dependencies resident at the individual computing asset.

7. The system of claim 4, wherein the computer system is further configured to perform:
   creating a dependency graph for the plurality of computing assets that stores data indicating circular dependencies within the plurality of computing assets;
   updating the dependency graph based at least in part upon new computing assets being added to the plurality of computing assets; and
   updating the startup workflow based at least in part upon the updated dependency graph.

8. The system of claim 4, wherein the computer system is further configured to perform:
   determining one or more physical failure domains within one or more data centers; and
   selectively directing the plurality of computing assets to be physically located within a specific physical failure domain within the one or more data centers based at least in part upon the determination of the reliance of the at least one computing asset upon the functionality of one or more other computing assets.

9. The system of claim 4, wherein the network-based services are located within one or more logical domains, and the computer system is further configured to perform:
   determining one or more logical domains for the plurality of computing assets; and
   selectively directing the plurality of computing assets to be located within a specific logical domain based at least in part upon the determination of the reliance of the at least one computing asset upon the functionality of one or more other computing assets.

10. The system of claim 4, wherein the detected dependency problems include at least one of a deadlock, a hanging state, data collision, or read/write fault.

11. The system of claim 4, wherein the computer system is further configured to perform:
   determining if there is a current dependency problem within the plurality of computing assets; and
   immediately executing a remedial startup workflow within the plurality of computing assets.

12. The system of claim 11, wherein the plurality of computing assets are restarted in a preboot execution environment (PXE).

13. A method, comprising:
   providing access to a plurality of computing assets to one or more client devices across a network, wherein individual computing assets of the plurality of computing assets include one or more software programs;
   calling interfaces of the plurality of computing assets to determine software program dependencies within the plurality of computing assets;
   determining, based at least in part on the calling, a reliance of at least one computing asset upon a functionality of one or more other computing assets during startup;
   creating a startup workflow for the plurality of computing assets to resolve detected dependency problems; and
   executing the startup workflow within the plurality of computing assets such that dependency within the plurality of computing assets is avoided.

14. The method of claim 13, further comprising selectively receiving user input of dependency within the plurality of computing assets.

15. The method of claim 13, further comprising:
   creating a dependency graph for the plurality of computing assets that stores data for circular dependencies within the plurality of computing assets;
   updating the dependency graph based at least in part upon new computing assets being added to the plurality of computing assets; and
   updating the startup workflow based at least in part upon the updated dependency graph.

16. The method of claim 13, further comprising:
   determining one or more physical failure domains within one or more data centers; and
   selectively directing the plurality of computing assets to be physically located within a specific physical failure domain within the one or more data centers based at least in part upon the determination of the reliance of the at least one computing asset upon the functionality of one or more other computing assets.

17. The method of claim 13, further comprising:
determining one or more logical domains for the plurality of computing assets; and
selectively directing the plurality of computing assets to be located within a specific logical domain based at least in part upon the determination of the reliance of the at least one computing asset upon the functionality of one or more other computing assets.

18. The method of claim 13, wherein determining the reliance of the at least one computing asset includes determining if dependency is present through a detection of at least one of a deadlock, a hanging state, data collision, or read/write fault.

19. The method of claim 13, wherein:
the plurality of computing assets are further within a plurality of availability zones, and
determining the reliance of the at least one computing asset upon the functionality of one or more other computing assets is based at least in part upon an availability zone of the plurality of computing assets.

20. The method of claim 13, further comprising:
monitoring the startup of the plurality of computing assets; and
correcting a dependency problem that occurs during the startup.

21. The method of claim 13, further comprising starting the plurality of computing assets in a preboot execution environment.

22. A non-transitory computer readable storage medium storing instructions that, when executed by one or more processors, cause the one or more processors to perform:
calling interfaces of a plurality of computing assets to determine software program dependencies within the plurality of computing assets, wherein individual computing assets of the plurality of computing assets include an interface for communicating dependency of one or more software programs resident at that respective computing asset;
determining, based at least in part on the calling, a reliance of at least one computing asset of the plurality of computing assets upon a functionality of one or more other computing assets during startup;
creating a startup workflow for the plurality of computing assets to resolve detected dependency problems; and
executing the startup workflow within the plurality of computing assets such that dependency within the plurality of computing assets is avoided.

23. The non-transitory computer readable storage medium of claim 22, the instructions further causing:
creating a dependency graph for the plurality of computing assets that stores data for circular dependencies within the plurality of computing assets;
updating the dependency graph based at least in part upon new computing assets being added to the plurality of computing assets; and
updating the startup workflow based at least in part upon the updated dependency graph.

24. The non-transitory computer readable storage medium of claim 22, the instructions further causing:
determining one or more physical failure domains within one or more data centers; and
selectively directing the plurality of computing assets to be physically located within a specific physical failure domain within the one or more data centers based at least in part upon the determination of the reliance of the at least one computing asset upon the functionality of one or more other computing assets.

* * * * *